United States Patent
Lee et al.

(10) Patent No.: US 9,517,583 B2
(45) Date of Patent: Dec. 13, 2016

(54) METHOD OF FORMING NATURAL FIBER POLYMER COMPOSITE

(71) Applicant: Ford Global Technologies, LLC, Dearborn, MI (US)

(72) Inventors: Ellen Cheng-Chi Lee, Ann Arbor, MI (US); Angela Harris, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 549 days.

(21) Appl. No.: 13/710,540

(22) Filed: Dec. 11, 2012

(65) Prior Publication Data

US 2014/0159276 A1    Jun. 12, 2014

(51) Int. Cl.
| | | |
|---|---|---|
| B29C 47/00 | (2006.01) | |
| B29C 47/92 | (2006.01) | |
| B29C 47/10 | (2006.01) | |
| B29C 47/80 | (2006.01) | |
| B29C 47/82 | (2006.01) | |
| B29C 47/08 | (2006.01) | |

(52) U.S. Cl.
CPC .......... *B29C 47/92* (2013.01); *B29C 47/1072* (2013.01); *B29C 47/0004* (2013.01); *B29C 47/0896* (2013.01); *B29C 47/1009* (2013.01); *B29C 47/1045* (2013.01); *B29C 47/1063* (2013.01); *B29C 47/1081* (2013.01); *B29C 47/805* (2013.01); *B29C 47/825* (2013.01); *B29C 2947/92695* (2013.01); *B29C 2947/92704* (2013.01); *Y02P 70/263* (2015.11)

(58) Field of Classification Search
CPC ............. B29C 47/0004; B29C 47/1009; B29C 47/1045;B29C 47/1063; B29C 47/1072; B29C 47/805; B29C 47/825; B29C 2947/92695; B29C 2947/92704
USPC ........................ 264/85, 176.1, 204, 211, 148
See application file for complete search history.

(56) References Cited

U.S. PATENT DOCUMENTS

| | | |
|---|---|---|
| 5,106,906 A | 4/1992 | Meier et al. |
| 5,120,559 A | 6/1992 | Rizvi et al. |
| 5,798,438 A | 8/1998 | Sawan et al. |
| 5,935,514 A | 8/1999 | Ford, Jr. et al. |
| 6,099,965 A | 8/2000 | Tennent et al. |

(Continued)

OTHER PUBLICATIONS

Office Action dated Jul. 16, 2014 for U.S. Appl. No. 13/710,534, filed Dec. 11, 2012, 7 pages.

(Continued)

*Primary Examiner* — Alison L Hindenlang
*Assistant Examiner* — Lawrence D Hohenbrink, Jr.
(74) *Attorney, Agent, or Firm* — Damian Porcari; Brooks Kushman P.C.

(57) ABSTRACT

A method of forming a natural fiber polymer composite includes the steps of introducing into an extruder a polymer, a natural fiber and a supercritical fluid to form a natural fiber polymer mixture; and extruding the natural fiber polymer mixture to form the natural fiber polymer composite at a temperature below a standard melting temperature of the polymer alone. The supercritical fluid may be introduced after the polymer is introduced into the extruder. The supercritical fluid may be introduced before or after the natural fiber is introduced into the extruder.

20 Claims, 2 Drawing Sheets

(56) References Cited

U.S. PATENT DOCUMENTS

| | | | |
|---|---|---|---|
| 6,593,384 B2* | 7/2003 | Anderson | B29C 44/348 |
| | | | 521/142 |
| 6,736,409 B2 | 5/2004 | Hollenberg | |
| 7,337,774 B2 | 3/2008 | Webb | |
| 7,387,749 B2 | 6/2008 | Gulari et al. | |
| 7,462,666 B2 | 12/2008 | Ottaviani et al. | |
| 7,767,124 B2 | 8/2010 | Goto et al. | |
| 8,106,105 B2* | 1/2012 | Cernohous | C08J 9/0066 |
| | | | 521/83 |
| 2003/0003291 A1* | 1/2003 | Shah | B29C 44/105 |
| | | | 428/317.9 |
| 2003/0031876 A1 | 2/2003 | Obeng et al. | |
| 2003/0032686 A1* | 2/2003 | Klotzer | B01D 39/1692 |
| | | | 521/50 |
| 2003/0092342 A1 | 5/2003 | Tennent et al. | |
| 2004/0084795 A1* | 5/2004 | Hornsby | B01J 3/008 |
| | | | 264/41 |
| 2004/0166203 A1 | 8/2004 | Gautam et al. | |
| 2006/0137817 A1 | 6/2006 | Ma et al. | |
| 2007/0176313 A1* | 8/2007 | Ogawa | B29C 44/12 |
| | | | 264/51 |
| 2007/0259169 A1 | 11/2007 | Williams et al. | |
| 2011/0283705 A1 | 11/2011 | Oliver | |
| 2014/0113032 A1 | 4/2014 | Reiser et al. | |

OTHER PUBLICATIONS

Lee, Sang Myung, et al., High-Pressure Rheology of Polymer Melts Containing Supercritical Carbon Dioxide, Korea-Australia Rheology Journal, vol. 18., No. 2, Jun. 2006, pp. 83-90.

Faruk, Omar, et al., Injection Moulded Microcellular Wood Fibre—Polypropylene, Composites Effect of Chemical Foaming Agents, Injection Parameters and Melt Flow Index on Physico—Mechanical Properties, University of Kassel, Monchebergstr, Kassel, Germany, pp. 1-8.

Bledzki, Andrzej K., et al., Microcellular Injection Molded Wood Fiber-PP Composites: Part I—Effect of Chemical Foaming Agent Content on Cell Morphology and Physico-Mechanical Properties, Journal of Cellular Plastics, vol. 4, Jan. 2006, pp. 63-76.

Nalawade, Sameer P., et al., Supercritical Carbon Dioxide as a Green Solvent for Processing Polymer Melts: Processing Aspects and Applications, Science Direct, Prog. Polym. Sci. 31, 2006, pp. 19-43.

\* cited by examiner

PP CELLULOSE

WITHOUT SCF

WITH SCF

PP SOY FLOUR

WITHOUT SCF

WITH SCF

PP COCONUT

WITHOUT SCF

WITH SCF

METHOD OF FORMING NATURAL FIBER POLYMER COMPOSITE

TECHNICAL FIELD

The present invention relates to a method of forming a natural fiber polymer composite.

BACKGROUND

Particularly due to their light weight, polymeric materials have been used in forming various automotive components. However, improvements in the mechanical properties of polymers are desired in order to meet more stringent performance requirements. Such mechanical properties may include stiffness, dimensional stability, modulus, heat deflection temperature, barrier properties, rust and dent resistance. Improved mechanical properties may reduce manufacturing costs by reducing the part thickness and weight of the manufactured part and the manufacturing time thereof. There are a number of ways to improve the properties of a polymer, including reinforcement with supplemental fibers. Providing an energy and cost effective way of producing polymeric materials with acceptable mechanical properties and light weighting benefits remains a challenge.

SUMMARY

A method of forming a natural fiber polymer composite includes the steps of introducing into an extruder a polymer, a natural fiber and a supercritical fluid to form a natural fiber polymer mixture; and extruding the natural fiber polymer mixture to form the natural fiber polymer composite. The supercritical fluid may be introduced after the polymer is introduced into the extruder. The supercritical fluid may be introduced before or after the natural fiber is introduced into the extruder.

The polymer may be introduced into the extruder as a solid and may be molten as present in the natural fiber polymer mixture. The supercritical fluid may be introduced into the extruder at a weight ratio smaller than one relative to the polymer.

The method may further include cooling the natural fiber polymer mixture prior to its extrusion out of the extruder. This may be carried out by cooling the natural fiber polymer mixture prior to the extrudate exiting the extruder, the extrudate including the polymer, the natural fiber and the SCF. The method may further include forming natural fiber polymer pellets from the natural fiber polymer composites.

DETAILED DESCRIPTION

Figure 1:
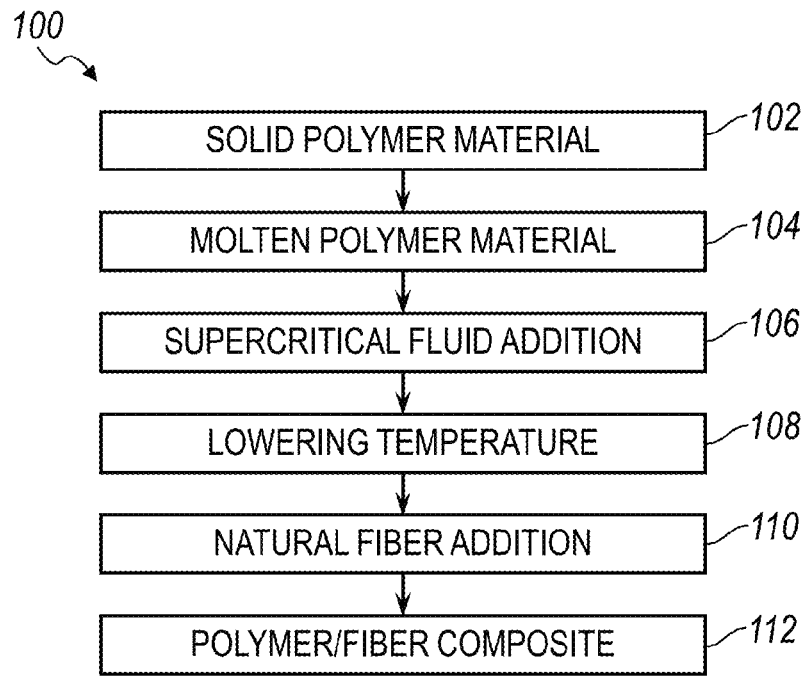
FIG. 1 depicts a flowchart of a non-limiting method for forming a natural fiber polymer composite.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Natural fiber reinforced thermoplastics offer a more environmental friendly alternative to glass and mineral reinforced thermoplastics. In addition, natural fiber reinforced thermoplastics are often lighter in weight than glass and mineral reinforced composites. Reinforced thermoplastic materials may be formed by melt extrusion, in which the thermoplastic is brought to a molten state in an extruder and reinforcement fibers or particles are mixed through shearing of the screws inside the barrel. However, during extrusion and injection molding, high melt temperatures of thermoplastics may degrade the natural fibers, and may produce odors and color that can be unacceptable for interior automotive and other appearance applications.

In one or more embodiments, the present invention is advantageous in providing a method of forming a natural fiber polymer composite, with the method including the use of supercritical fluids (SCF) to reduce the processing temperature, which in turn can limit the degree of thermal degradation. When supercritical fluids are mixed into a thermoplastic resin in the molten state, the viscosity and/or melting point of the resin may be reduced due to the swelling with the supercritical fluid, with the supercritical fluid acting as the solvent. This allows the processing temperature to be reduced in the area after the supercritical fluid is introduced and allows processing at temperatures well below the normal range. For many thermoplastic resins, the achievable temperatures will also be below the thermal stability of the natural materials.

According to one embodiment, a method is provided to form a natural fiber polymer composite (NFPC) which may be used in forming automotive components. As illustratively depicted in FIGS. 1 and 2, a method of forming a polymeric article is generally shown at 100. As will be detailed herein elsewhere, method 100 permits formation of a natural fiber polymer composite via extrusion, wherein the extrusion temperature can be below the melting point of the polymer material from which the polymeric article is formed. Therefore, higher melting polymers can be employed at lower extrusion temperatures than is currently possible through the use of supercritical fluids. The use of higher melting polymers allows greater selection of polymers, while the use of certain of these high melting polymers is currently not readily available at least within the context of forming natural fiber polymer composites.

At step 102, a solid polymer material is provided, for instance, into an extruder 200 via entry 208. The solid polymer material may take the form of polymer pellets of one or more of any suitable geometrical shapes. This method is particularly useful for those solid polymer materials which require a relatively higher temperature to melt, and at these higher temperatures, direct addition of natural fibers into the molten polymer material would produce repugnant odors.

The polymer material may include one or more thermoplastic polymers. Non-limting examples of the polymer material include polyolefins such as polyethylene and polypropylene; polyamides(nylons) such as polycaprolactam (nylon 6), poly(hexamethylene adipamide) (nylon 6,6), poly(hexamethylene sebacate) (nylon 6,10), and poly(decamethylene carboxamide) (nylon 11); polyvinyl chloride; polyesters such as poly(ethylene terephthalate) and poly(butylene terephthalate); fluoropolymers; polymethyl methacrylate; polystyrene; polycarbonate; poly(phenylene sulphide) (PPS), among others.

The present invention, in one or more embodiments, provides a method of forming polymeric composites from predominantly high melt polymers, which can not be accommodated over certain conventional methods at least because these high melt polymers often requires a melting temperature substantially incompatible with these conventional methods. In this connection, the solid polymer material may include less than 10 weight percent of low melt polymers with melting temperatures of no greater than 185, 175, 175 or 155 degrees Celsius. Non-limiting examples of these low melt polymers include polypropylene and polyethylene. In certain instances, the solid polymer material includes at least one of nylon 6 and nylon 6,6.

At step 104, the solid polymer material provided at step 102 is subjected to an elevated temperature to be molten to form a molten polymer material. This step may be carried out at section 202 of the extruder 200.

At step 106, a supercritical fluid is introduced, which will eventually make its way into and contact the molten polymer material. The supercritical fluid may be introduced into the extruder 200 at section 204 downstream of the section 202.

The supercritical fluid may be introduced at any suitable weight ratios and may vary as to whether the melt process occurs in a melt extrusion or an injection molding. For instance, the supercritical fluid may be introduced at a weight ratio of no less than 0.5%, 1.0%, 1.5%, 2.5% or 5%, and no greater than 20%, 15%, 10% or 7.5% relative to the polymer. In certain particular instances, the supercritical fluid may be introduced at a weight percent of 0.5% to 5%, 5% to 20%, 5% to 15%, 5% to 10%, or 10% to 20% relative to the polymer.

The supercritical fluid may exist as a fluid having properties of both a liquid and a gas when above its critical temperature and critical pressure. Without wanting to be limited to any particular theory, it is believed that the supercritical fluid at its supercritical conditions has both a gaseous property of being able to penetrate through many materials and a liquid property of being able to dissolve materials into their components. A non-limiting example of the supercritical fluid is carbon dioxide. Other examples of the supercritical fluid may include methane, ethane, nitrogen, argon, nitrous oxide, alkyl alcohols, ethylene propylene, propane, pentane, benzene, pyridine, water, ethyl alcohol, methyl alcohol, ammonia, sulfur hexaflouride, hexafluoroethane, fluoroform and/or chlorotrifluoromethane.

Although not wanting to be limited to any particular theory, it is believed that the low viscosity and high diffusivity of the supercritical fluid allows the supercritical fluid to become disposed in the natural fiber polymer mixture during supercritical conditions. This provides an increase in swelling of the polymeric material thereby reducing the viscosity and decreasing the freezing point.

The supercritical fluid may include a near critical fluid, which has a parameter such as a pressure or a temperature slightly off the pressure or the temperature of its critical condition. For example, the critical pressure of carbon dioxide is 73.8 bar and its critical temperature is 301K. For nitrogen, its critical pressure is 33.999 bar and its critical temperature is 126.15 K. These fluids may have near critical conditions at pressures of between 5 to 10 bar below their critical pressures and temperatures of between 5 to 10 degrees below their critical temperatures. A fluid at its near critical condition typically experiences properties such as enhanced compressibility and low surface tension, among others. Temperatures and pressures above the critical point of the compound are by definition supercritical. All of these conditions define a supercritical condition of carbon dioxide whereby the polymer material may solubilize in the supercritical carbon dioxide. However, other ranges may be used for other supercritical fluids without falling beyond the scope or spirit of the present invention. Pressurizing and heating the particles with the supercritical fluid may be accomplished by any conventional means.

Using supercritical fluids may also be beneficial in that recycle-ability of the final polymeric product is maximized. In contrast, a chemical foaming agent typically reduces the attractiveness of a polymer to recycling since residual chemical foaming agent and foaming agent by-products contribute to an overall non-uniform recyclable material pool. This is because articles formed with chemical foaming agents inherently include a residual, unreacted chemical foaming agent, as well as chemical by-products of the reaction that forms a foaming agent. Because supercritical fluid leaves the final polymer product via, for instance, evaporation, the final polymer product is less likely to contain any unwanted chemicals as the case for chemical foaming agent. In this connection, supercritical fluid may be considered as a physical foaming agent. Any of a wide variety of physical foaming agents such as helium, hydrocarbons, chlorofluorocarbons, nitrogen, carbon dioxide, and the like can be used.

When carbon dioxide is used as the supercritical fluid, supercritical carbon dioxide can be introduced into the extruder 200 and made to form rapidly a single-phase solution with the polymeric material either by injecting carbon dioxide or other foaming agent as a supercritical fluid, or injecting carbon dioxide as a gas or liquid and allowing conditions within the extruder to render the foaming agent supercritical, in many cases within seconds. The single-phase solution of supercritical carbon dioxide and polymeric material formed in this manner may have a very low viscosity which advantageously allows lower temperature processing.

Once introduced into the extruder 200, the supercritical fluid should be led in a way such that flow of the supercritical fluid back into the section 202 is minimized and prevented.

Referring back to FIG. 2, temperature control devices 230, 232 may be used to adjust temperatures within the extruder 200. For instance, device 230 may be used to heat the section 202 of the extruder 200 to a temperature at which the polymer material melts. For instance also, device 232 may be used to cool down the section 206 of the extruder 200 such that the natural fibers may be mixed with the polymer material at a relatively lower temperature.

A pressure and metering device 234 may be provided between supercritical fluid source 236 and that an inlet 238 for the swelling agent. The metering device 234 may be used to meter the mass of the supercritical fluid in an amount specified herein elsewhere so as to control the amount of the swelling agent in the polymeric stream within the extruder to maintain swelling agent at a desired level.

At step 108, the temperature of the polymer mixture is lowered. Without wanting to be limited to any particular theory, it is believed that upon mixing with the supercritical fluid, the polymeric material's viscosity is reduced and the melting temperature is depressed below those values of the pure polymer. Therefore less external energy is needed to induce and maintain the melting of the polymer. The reductions in viscosity and melt temperature allow the processing temperature at step 108 to be substantially reduced below the otherwise standard/typical processing temperatures or even the pure polymer melt temperature. The term "substantially" may indicate a reduction in temperature of at least 10, 20, 30, 40, 50, 60, 70, 80 or up to 90 degrees Fahrenheit below the otherwise stand/typical processing temperatures or the pure polymer melt temperature. The melting temperature of a given composition may be determined via any suitable methods. One non-limiting example of the method is Differential Scanning calorimetry (DSC).

Standard/typical melting temperatures and processing temperatures for certain polymers are tabulated in Table 1 below. The standard/typical processing temperatures are provided in a range, to the extent that different zones of a processing machine such as extruders are concerned. Within a given zone of a given extruder, the standard/typical processing temperature should not vary much. With the advantages of the present invention in one or more embodiments as detailed herein, the actual processing temperature maintained for that given zone of the extruder may be lowered to a temperature that is at least 10, 20, 30, 40, 50, 60, 70, 80 or 90 degrees Fahrenheit lower than the standard/typical processing temperatures exemplified in Table 1. When the temperature lowering is significant enough, the actual processing temperature may be below the standard/typical melting temperature of the pure polymer by itself.

TABLE 1

| Polymer | Standard/Typical Melting Temperature (° F.) | Standard/Typical Processing Temperature Range (° F.) |
| --- | --- | --- |
| Polyethylene | 266 | 310-330 |
| Polypropylene | 348 | 395-420 |
| Nylon 6 | 437 | 450-485 |
| Nylon 6,6 | 509 | 520-540 |
| Nylon 6,10 | 440 | 480-520 |
| Poly(ethylene terephthalate) | 509 | 520-570 |
| Poly(butylene terephthalate) | 433 | 420-470 |
| Polystyrene | 334 | 430-490 |
| Polycarbonate | 430 | 520-570 |
| Poly(phenylene sulphide) | 536 | 580-650 |

Taking polypropylene for an example, the actual processing temperature at step 108 may be 80 degrees F. lower than the standard/typical processing temperature of 395 to 420 F, arriving at a temperature of 315 to 340 F, which is even lower than the standard/typical melting temperature of polypropylene. In other words, with the present invention in one or more embodiments, polypropylene may be processed at a temperature lower than its standard/typical melting temperature. What this translates to is that one can actively lower the temperature in this processing zone to a temperature lower than the standard/typical processing temperature or melting temperature of the given polymer in pure form, wherein at this lowered temperature the given polymer would have not been processable but for the benefits imparted by the present invention in one or more embodiments as detailed herein.

Figure 2:
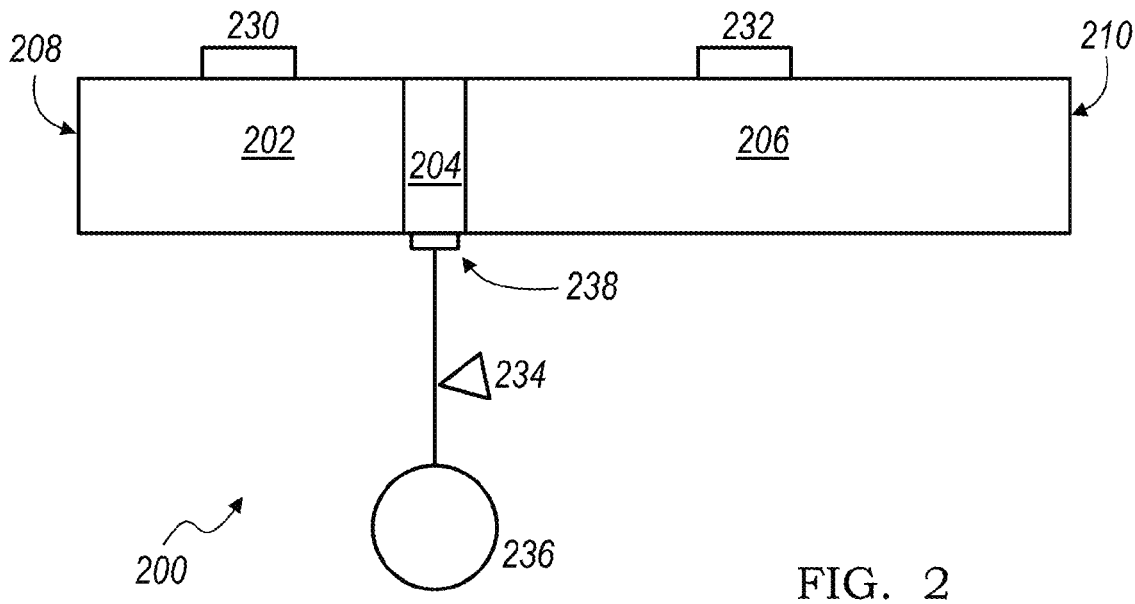
FIG. 2 depicts a flowchart of a non-limiting extrusion method for forming a natural fiber polymer composite.

At step 110, natural fiber may be added to the relatively cooled polymer mixture out of step 108. The addition of nature fiber may be carried out at a section 206 downstream of section 202. Although section 206 is depicted in FIG. 2 as being downstream of section 204, it does not have to be. In certain instances, the addition of the supercritical fluid and the addition of the natural fibers may be carried out in the same section of the extruder 200. In addition, the natural fibers may also be added at the same time as the solid polymer. The invention, in one or more embodiments, has the best effect for limiting degradation of the natural fibers if the elevated temperature exposure of the fibers is minimized. However, even small benefits may be achieved by use of SCFs, no matter when the natural fibers are introduced.

At step 112, the polymer fiber composite is thereafter formed and extruded from exit 210 of the extruder 200.

The reinforcement fibers may entirely be of renewable resources and are natural fibers in particular. In this connection, non-renewal fibers such as glass fibers, metal powder or ceramic powders are excluded, and are of less than 10, 5, 1, 0.1 or 0.05 weight percent of the total weight of the final polymeric article, if incidentally included.

Natural fibers come from natural sources such as animals and plants. These natural fibers may be organic, renewable natural fibers. Some of the natural fibers like vegetable fibers are obtained from the various parts of the plants. They are provided by nature in ready-made form. It includes protein fibers such as wool and silk, and cellulose fibers such as cotton and linen.

Vegetable fibers are composed mainly of cellulose, with non-limiting examples including cotton, jute, flax, ramie, sisal and hemp. Seed fibers are collected from seeds or seed cases, such as cotton and kapok. Leaf fibers are collected from leaves, such as fique, sisal, banana and agave. Bast fibers are collected from the skin or bast surrounding the stem of their respective plant. Fruit fibers are collected from the fruit of the plant, such as coconut fibers. Plant fibers are collected from the stalks of the plant, including straws of wheat, rice, barley, bamboo and grass, and tree wood.

Animal fibers may include proteins such as collagen, keratin and fibroin, with non-limiting examples including silk, sinew, wool, catgut, angora, mohair and alpaca.

In certain instances, the natural fiber includes a soy fiber, which includes at least one of soy meal, soy flour and soy hull. The soybean meal may refer to the material remaining after solvent extraction of oil from soybean flakes, with a certain percentage of soy protein content. The meal may be "toasted" with moist steam and ground in a hammer mill. The soy flour may refer to defatted soybeans and is the starting material for production of soy concentrate and soy protein isolate. The soy flour may be conventionally made. In particular, defatted soy flour is obtained from solvent extracted flakes, and contains less than 1% oil.

The polymer material may further include one or more inorganic fillers. Non-limiting examples of the inorganic filler are carbon black, mica, talc, silica, calcium carbonate, sericite, alumina, magnesium carbonate, titanium oxide, clay, talc, magnesium oxide, and aluminum hydroxide.

The polymer material may not include any substantial amount of inorganic polymers such as which may be polymers with a skeletal structure that does not include carbon atoms. Non-limiting examples of the inorganic polymers include Si, S, N, P and/or B.

Having generally described several embodiments of this invention, a further understanding can be obtained by reference to certain specific examples which are provided herein for purposes of illustration only and are not intended to be limiting unless otherwise specified.

EXAMPLE

For compounding, single screw extruder with Maddock mixing section is used. Polymer materials in solid pellets along with natural fibers are introduced into the extruder and the supercritical $CO_2$ as the supercritical fluid is introduced downstream of the entry for the polymer pellets. The supercritical fluid is introduced at a rate of 5 to 20 weight percent defined as the weight of the supercritical fluid relative to the total dry weight of the combined materials of the polymer pellets and the natural fibers. The compounding may be carried out in an in-line process where the materials are continuously fed and mixed composite materials are continuously collected and removed from the extruder. In this connection, the rate of 5 to 20 weight percent may be defined as the weight of the supercritical fluid relative to the weight of natural fiber thermoplastic composite coming out of the extruder.

The polymer material used for the evaluation is polypropylene with fiber loading of 20%. Three different types of the natural fibers used in the testing are cellulose, soy flour and coconut shell powder.

Polypropylene and coconut shell powder compounding conditions are listed in Table 2 below.

TABLE 2

| Area | Control | Sample with SCF | Difference |
|---|---|---|---|
| Flow Rate (lbs/hr) | 9.7 | 8.8 | −1.1 |
| SCF 5% (lbs/hr) | 0 | 0.4 | 0.4 |
| Temperature (° F.) | | | |
| Zone 1-4 | Same for both | | |
| Zone 5 | 375 | 307 | 68 |
| Zone 6 | 380 | 307 | 73 |
| Clamp | 385 | 315 | 70 |
| Adapter | 385 | 315 | 70 |
| Die | 400 | 315 | 85 |

As indicated in Table 2, the column with the first row heading of "Control" refers to parameters in a comparison group where no supercritical fluid is used in the melt extrusion; and the column with the first row heading of "Sample with SCF" refers to parameters in a comparison group where supercritical fluid is used in the melt extrusion. In the "Sample with SCF" group, the supercritical fluid is applied at a rate of 0.4 lbs/hr and the solid materials including the polymer pellets and the natural fibers are applied at a rate of 8.8 lbs/hr. Therefore, the supercritical fluid is applied at a weight percent of 5 wt % relative to the solid weight of the polymers and the natural fibers.

As further indicated in Table 2, in zone areas downstream of where the supercritical fluid is introduced, namely Zone 5, Zone 6, Clamp area, Adapter area, and Die area, a substantial reduction in processing temperature is reported. For instance in Zone 5, the processing temperature is reduced from 375° F. down to 307° F., with the latter being below the melting temperature of the polymer used, namely polypropylene. This is significant because less energy may be needed to maintain a relatively lower processing temperature inside the extruder barrel.

Color evaluation may be carried out via visual inspection. Color ratings may be described in Table 3 shown below, where the color shift is in comparison to the pure polymer.

TABLE 3

| Rating | Description |
|---|---|
| 1 | No noticeable color shift |
| 2 | Slight, but noticeable color shift |
| 3 | Definite color shift, but not strong enough to be visibly distinct |
| 4 | Strong visible color shift |
| 5 | Very strong visible color shift |

Figure 3:
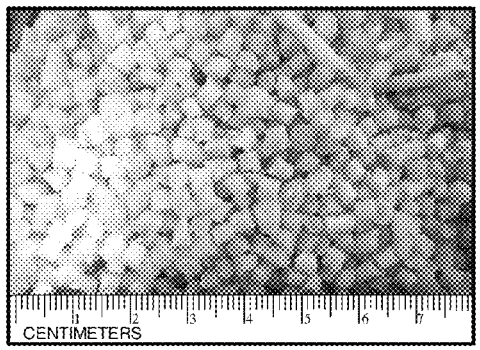
FIG. 3 depicts color appearances of the products referenced in Table 2.
Figure 3:
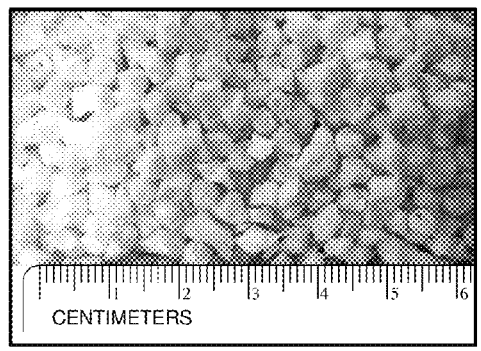
Figure 3:
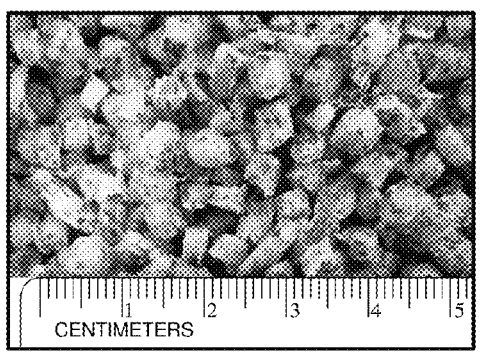
Figure 3:
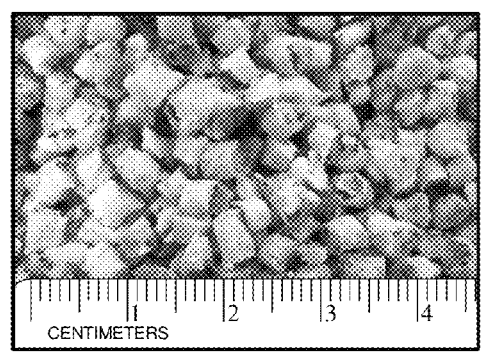
Figure 3:
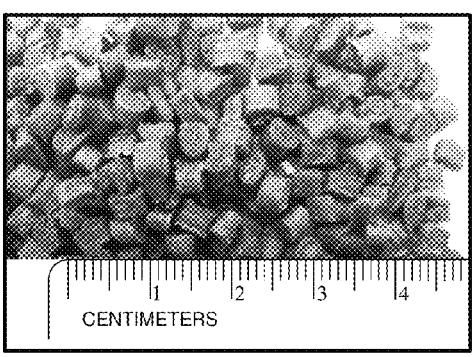
Figure 3:
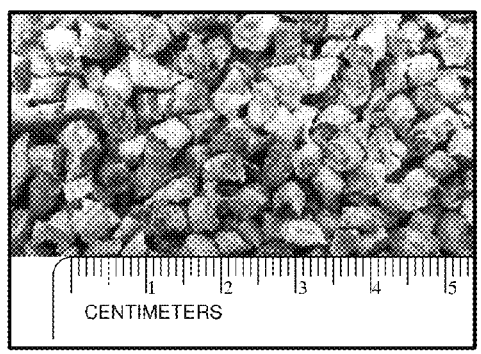

FIG. 3 shows that polypropylene cellulose composite has a color rating of 3 without supercritical fluid treatment and has a color rating of 1 with supercritical fluid treatment, that polypropylene soy flour composite has a color rating of 5 without supercritical fluid treatment and has a color rating of 3 with supercritical treatment, and that polypropylene coconut composite has a color rating of 5 without supercritical fluid treatment and has a color rating of 3 with supercritical treatment.

These results shown in FIG. 3 suggest that natural fiber polymer composites have a relatively lesser color shift after melt processing when using supercritical fluids. In these examples, pure polypropylene is reinforced with natural fibers such as coconut shell powder, soy flour, and purified cellulose fiber. Pure polypropylene is colorless and translucent. When combined with coconut shell powder, soy flour, or purified cellulose, the composites not only take on the color of natural fiber materials, but also darken due to the fiber degradation. When processed using supercritical fluid, the decrease in temperature results in a lesser fiber degradation and hence a lighter colored composite material. The coconut shell powder and polypropylene composite processed without the supercritical fluid has a dark brown color, while the supercritical fluid processed composite has a medium brown color.

U.S. patent application Ser. No. 13/710,534 filed Dec. 11, 2012, may be related to the method disclosed and claimed herein, and is incorporated herein by reference in its entirety.

While the best mode for carrying out the invention has been described in detail, those familiar with the art to which this invention relates will recognize various alternative designs and embodiments for practicing the invention as defined by the following claims.

What is claimed:

1. A method comprising:
   (a) introducing a polymer into a first zone of an extruder;
   (b) melting the polymer in the first zone to form a molten polymer flowing downstream into a second zone of the extruder;
   (c) introducing a supercritical fluid into the second zone to lower the temperature of the molten polymer flowing downstream into a third zone of the extruder;
   (d) introducing a natural fiber into the third zone to form a natural fiber polymer mixture at a temperature lower than the melting point of the polymer; and
   (e) extruding the natural fiber polymer mixture through an exit of the extruder to form a polymer fiber composite having a first color change rating using steps (a), (b)

and (d) but not (c) and a second color change rating using steps (a), (b), (c) and (d), the first color change rating represents a stronger visible color shift than the second color change rating.

2. The method of claim 1, wherein the temperature of the natural fiber polymer mixture in the third zone is at least 10° F. lower than the melting point of the polymer.

3. The method of claim 1, wherein the temperature of the natural fiber polymer mixture in the third zone is at least 80° F. lower than the melting point of the polymer.

4. The method of claim 1, wherein the molten polymer in the third zone is cooled with a temperature control device before introducing the natural fiber.

5. The method of claim 1, wherein the supercritical fluid is $CO_2$.

6. The method of claim 1, wherein the polymer is introduced into the first zone in a solid form.

7. The method of claim 1, wherein the weight ratio of the supercritical fluid to the molten polymer in the second zone is no greater than 20%.

8. The method of claim 1, further comprising forming natural fiber polymer pellets from the natural fiber polymer mixture.

9. The method of claim 1, wherein the polymer includes a polyamide polymer.

10. The method of claim 1, wherein the polymer includes at least one of a nylon 6, a nylon 6,6, nylon 6,10 and a nylon 11 polymer.

11. The method of claim 1, wherein the natural fiber includes at least one of cellulose, soy flour and coconut shell powder.

12. A method comprising:
(a) introducing a near critical fluid into a molten polymer in a first zone of an extruder to lower the temperature of the molten polymer flowing downstream into a second zone of the extruder; and
(b) introducing a natural fiber into the molten polymer in the second zone to form a natural fiber polymer mixture at a temperature lower than the melting point of the polymer; and
(c) extruding the natural fiber polymer mixture through an exit of the extruder to form a polymer fiber composite having a first color change rating using steps (b) but not (a) and a second color change rating using steps (a) and (b), the first color change rating represents a stronger visible color shift than the second color change rating.

13. The method of claim 12, wherein the second zone is downstream of the first zone.

14. The method of claim 12, further comprising restricting the flow of the near critical fluid into the second zone.

15. The method of claim 12, wherein the molten polymer is polypropylene.

16. The method of claim 12, wherein the temperature of the natural fiber polymer mixture in the third zone is at least 80° F. lower than the melting point of the polymer.

17. A method comprising:
(a) introducing a polymer into a first zone of an extruder;
(b) melting the polymer in the first zone to form a molten polymer flowing downstream into a second zone of the extruder;
(c) introducing a supercritical fluid into the second zone to lower the temperature of the molten polymer flowing downstream into a third zone of the extruder;
(d) introducing a soy fiber into the third zone to form a natural fiber polymer mixture; and
(e) extruding the natural fiber polymer mixture through an exit of the extruder to form a polymer fiber composite having a first color change rating using steps (a), (b) and (d) but not (c) and a second color change rating using steps (a), (b), (c) and (d), the first color change rating represents a stronger visible color shift than the second color change rating.

18. The method of claim 17, wherein the third zone is downstream of the first and second zones.

19. The method of claim 17, wherein the second zone is downstream of the first zone.

20. The method of claim 17, wherein the polymer is polypropylene.

* * * * *